(12) United States Patent
Monson et al.

(10) Patent No.: US 7,035,521 B2
(45) Date of Patent: Apr. 25, 2006

(54) METHOD AND APPARATUS FOR THE INTEGRATION OF A VCSEL FLEX WITH A PARALLEL OPTICAL TRANSCEIVER PACKAGE

(75) Inventors: Robert J. Monson, St. Paul, MN (US); Richard L. Cellini, St. Michael, MN (US); Jianhua (Jack) Yan, Prior Lake, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 236 days.

(21) Appl. No.: 10/640,583

(22) Filed: Aug. 13, 2003

(65) Prior Publication Data

US 2005/0036754 A1   Feb. 17, 2005

(51) Int. Cl.
*G02B 6/00* (2006.01)
(52) U.S. Cl. .......................... 385/136; 385/134
(58) Field of Classification Search ............ 385/134, 385/136
See application file for complete search history.

(56) References Cited

U.S. PATENT DOCUMENTS

| 5,859,947 A | 1/1999 | Kiryuscheva et al. |
| 6,142,791 A | 11/2000 | Yagi et al. |
| 6,190,056 B1 | 2/2001 | Kwon et al. |
| 6,318,909 B1 | 11/2001 | Giboney et al. |
| 6,498,892 B1 | 12/2002 | Harman |
| 6,642,613 B1 | 11/2003 | Nguyen et al. |
| 6,767,141 B1 * | 7/2004 | Dudek et al. .............. 385/92 |

* cited by examiner

*Primary Examiner*—Jennifer Doan
(74) *Attorney, Agent, or Firm*—Brooks & Cameron, PLLC

(57) ABSTRACT

A method of integrating an optoelectronic device, for example a vertical cavity surface emitting laser, onto the electronic substrate of a parallel optical transceiver package by positioning and maintaining the exact relative alignment of the optoelectronic device relative to the electronic substrate for application of adhesive and curing. The method includes the utilization of a multi-piece fixture which clamps the elements into position and maintains position throughout the curing process. Alternatively, the fixture can comprise a unitary assembly for clamping the elements into position and maintaining their position throughout the curing process.

30 Claims, 7 Drawing Sheets

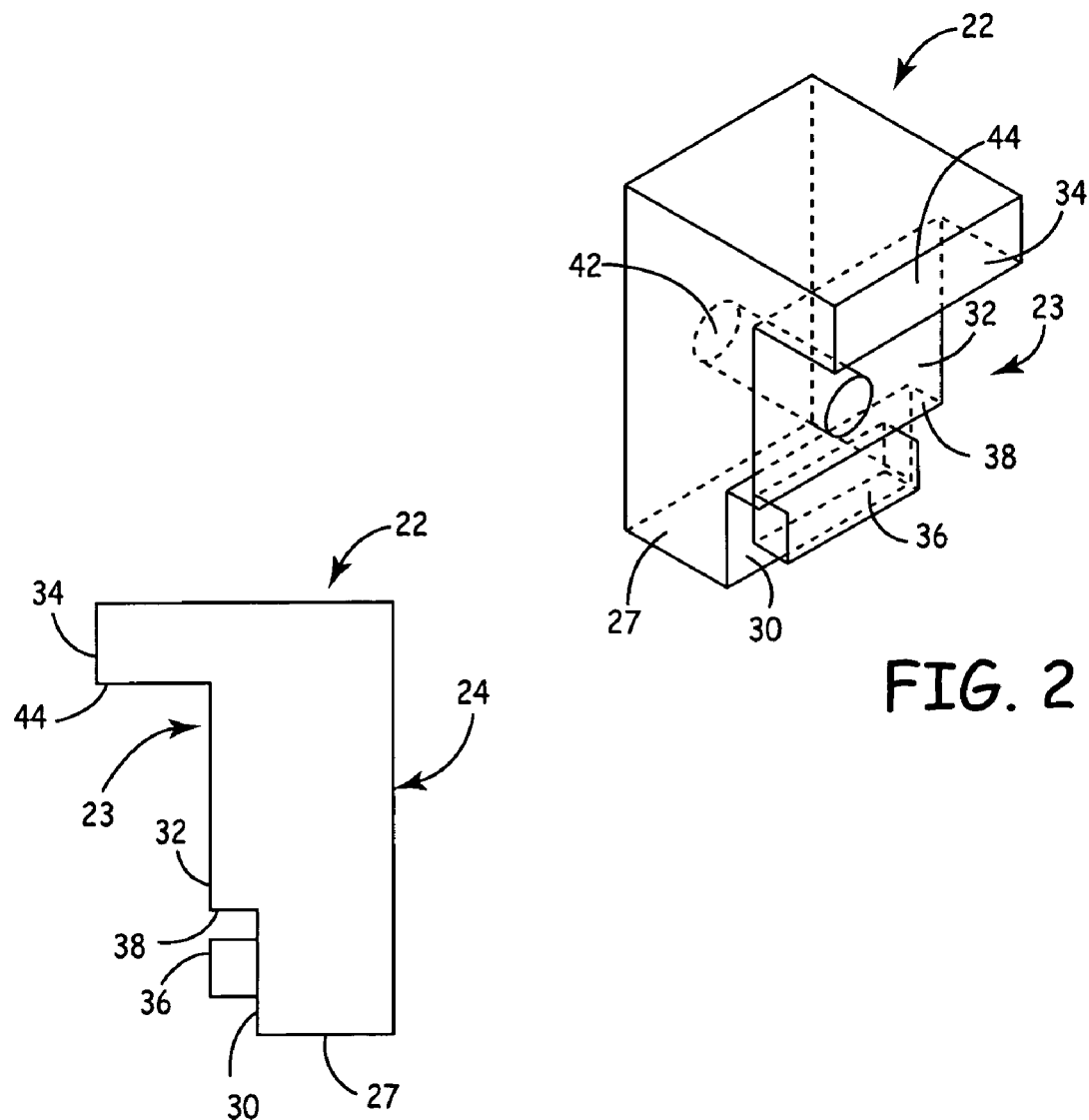

METHOD AND APPARATUS FOR THE INTEGRATION OF A VCSEL FLEX WITH A PARALLEL OPTICAL TRANSCEIVER PACKAGE

FIELD OF THE INVENTION

The present invention relates to a method for the integration of an optoelectronic device, with a parallel optical transceiver package, and more particularly to integrating a vertical cavity surface emitting laser with the electronic interface substrate of the parallel optical transceiver package. The invention further relates to an assembly tool for the above-described method utilizing a fixture which aligns the VCSEL with the electronic interface substrate and maintains the relative position of the components for adhesive application and curing.

BACKGROUND OF THE INVENTION

There is a need for a high-speed cost effective optical transmitters which can operate as parallel communications data links. The primary function of the optical transmitter is to translate electrical signals into optical signals which are carried over a fiber optic path. The optical transmitter includes an optoelectronic device, such as a vertical cavity surface emitting laser (VCSEL).

Connection of the optoelectronic device with the electronic interface substrate of the package is complicated due to geometric constraints. The VCSEL emits light in a generally perpendicular direction to the plane of the optical fibers and substrate, therefore making stacking of such components difficult. To solve the packaging problem, the VCSEL is either mounted parallel to the substrate and the output photons directed 90° through mirrors or the VCSEL is mounted perpendicular to the substrate and the electric interface connectors are rotated 90°. The optical bending solution is less than optimal due to the difficult optical design and mirror alignment required. Conversely, the bending of electrical conductors is well known in the art through the implementation of flexible circuits. Therefore, flexible electrical circuits capable of achieving the necessary 90° bend are generally the accepted solution.

There is a need then for a manufacturing method which allows for efficient positioning of the flexible circuit on the electronic interface substrate and maintaining that position during the curing of the adhesive. The problem of alignment and bending of the flexible circuit are exacerbated as data rates of optoelectronic devices increase. Closer connections must be established in order to retain electrical performance levels. The placement and bending of the flexible surface on the substrate is typically performed manually by a skilled technician just prior to application of a bonding adhesive. Unfortunately, the existing techniques employed in connection with this process are time consuming, expensive and prone to failure due to misalignment. If the placement of the flexible circuit fails to align with the substrate connectors, the entire component may need to be scrapped. While manual bending and aligning techniques exist for mounting an optoelectronic device to the substrate, it would be desirable to improve the efficiency and reduce the cost of coupling.

SUMMARY OF THE INVENTION

The present invention is a method and integration tool for the alignment and placement of an optoelectronic device onto the electronic interface substrate of a parallel optical transceiver package. The tool is comprised of a clamp assembly and a VCSEL spring. The clamp assembly positions the VCSEL with the flexible circuit disposed on the electronic interface substrate. Once positioned, the VCSEL is held in place by means of a spring pushing against the blind side of the VCSEL. The clamp assembly is preferably constructed of a metal such as aluminum to facilitate the curing process, which may require elevated temperatures.

The present invention provides a cost efficient method for aligning and connecting an optoelectronic device to the electronic interface circuitry of the package. It is essential that the exact alignment of the VCSEL position be maintained throughout the assembly process. The present invention enables repeatable and consistent placement of the flexible circuit onto the electronic substrate. The integration method maintains the integrity of the VCSEL flex circuit connection while reducing the time intensive manual component of assembly. Furthermore, the mechanical aspect of the process provides a reliable means of duplicating successful placement, thus increasing the output of properly aligned assemblies.

In a preferred embodiment, the optoelectronic devices are VCSEL arrays to which a flexible circuit is attached. The flexible circuit contains electrical traces on one side which provide current pathways to the VCSEL from the integrated circuits of the package. The flexible circuit extends from the VCSEL and is attached to a spacer block so that the electrical traces may be attached to the parallel optical transceiver package.

In operation, the VCSEL is placed within a recess in the spring clamp frame of the clamp assembly with the flexible circuit extending toward the electronic substrate. The clamp base and spring clamp frame are then loosely fastened over the parallel optical transceiver package. Relative position is maintained by a support element of the clamp base which is inserted into the optical connector port of the parallel optical transceiver package. Lateral motion is further restricted by a projecting flange of the clamp base which caps the spring clamp frame. The completed fixture, when properly positioned, is fixed by a threaded fastener. The VCSEL is held in place by a flat spring pinning the VCSEL to a support element of the clamp base. Adhesive is applied and the entire system allowed to cure.

In an alternative embodiment, the clamp assembly comprises a unitary assembly in which the clamp base and spring clamp frame are hingedly connected to rotatably interface with the VCSEL and the parallel optical transceiver package.

BRIEF DESCRIPTION OF DRAWINGS

FIG. 2 is an isometric view of the clamp base block of the present invention

FIG. 3 is a side view of the clamp base block of the present invention.

DETAILED DESCRIPTION OF THE PREFERRED EMBODIMENT

In the following detailed description of the present invention, numerous specific details are set forth in order to provide a thorough understanding of the present invention. However, it will be obvious to one skilled in the art that the present invention may be practiced without these specific details. In other instances, well-known methods, procedures, components and circuits have not been described in detail so as to not unnecessarily obscure aspects of the present invention.

The present invention is a tool and method for the integration of an optoelectronic device to a parallel optical transceiver package. Fiber optic transmitter and receiver electrical elements are implemented on two separate substantially parallel boards. The boards are disposed substantially perpendicular to the base of the optoelectronic device. A flexible circuit is bent 90° in order to join the optoelectronic device to the electrical circuitry of the parallel optical package.

In the preferred embodiment, the present invention is used for the integration of a vertical cavity surface emitting laser (VCSEL) within a parallel optical transceiver package. In this geometric configuration, light emitted from the surface of the VCSEL laser is oriented nominally along a plane parallel to the substrate. This is the preferred direction for the optical portion of the package because the optical cable can then extend parallel to the substrate thus allowing multiple packages to be stacked.

A flexible circuit, bent at a substantially right angle, is used to electrically connect pads on the substrate to pads on the optoelectronic dies, which are oriented perpendicular to the substrate. The flexible circuit has leads defined in one single layer protected by a sheet of insulating material. At a first end of the flexible circuit, bonds are used for the connection to the optoelectronic dies. At the opposing end an array of large pads provides landing sites. After the flexible circuit is secured in its aligned position in the cavity of the substrate, each of its leads are electrically connected to corresponding pads on the substrate by a series of wire bonds.

Accurately aligning the bonding sites on the substrate to the flexible circuit is a challenging step. Too great an offset between bonding sites can effect wire bond yields and process time and create a high inductance electrical subsystem, due to the longer wires and higher wire loops required to accommodate a large lateral offset. It should be noted that placement errors can impact the amount of noise introduced into the system, possibly making the system not functional. However, these placement errors can be kept to a minimum through the careful design and assembly of component parts using the present invention.

Figure 1:
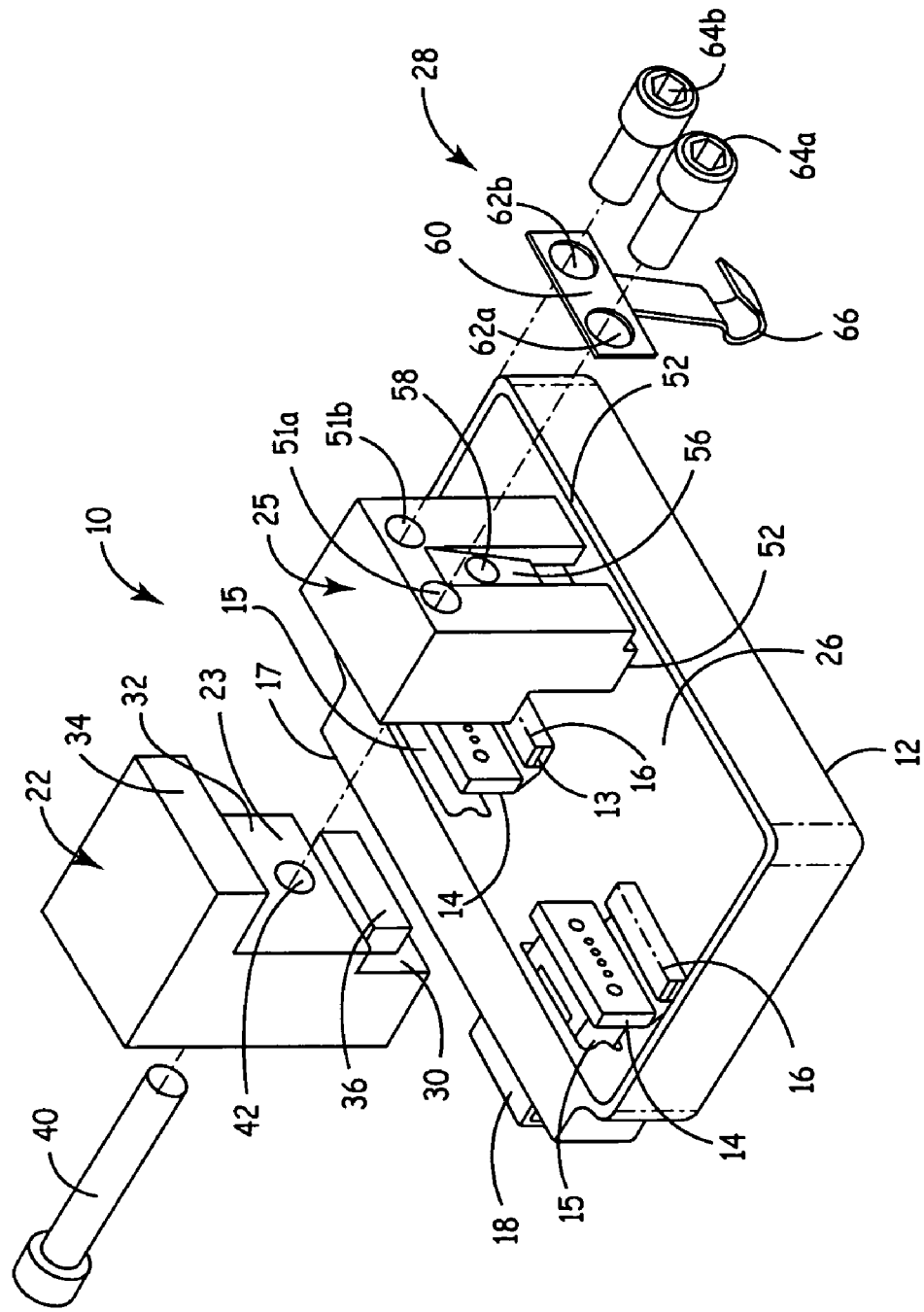
FIG. 1 is a perspective view of a laser package integration tool with a parallel optical package in place.

An optoelectronic device integration tool 10, in accordance with the present invention, is constructed as shown in FIGS. 1–6. FIG. 1 is an exploded perspective view of the optoelectronic device integration tool 10, which provides for alignment of the optoelectronic device, and a parallel optical transceiver package 12. In a first embodiment, the optoelectronic device 10 is comprised of a vertical cavity surface emitting laser (VCSEL) 14, the active face of which is mounted on a flexible circuit 16.

As illustrated by FIG. 1, a single optoelectronic device integration tool 10 integrates a single VCSEL 14 with the parallel optical transceiver package 12. It is possible for a pair of tools 10 to be used simultaneously. The present invention requires that integration of VCSEL 14 occurs prior to the alignment and connection of the fiber optic assembly 18. Note that FIG. 1 includes an illustration of a completed system in the first port with an integrated VCSEL 14 and connected fiber optic assembly 18 and the second port contains a VCSEL 14 in the process of integration by tool 10.

The optoelectronic device integration tool 10 is substantially a clamp comprised of two separate blocks, which are preferably machined from aluminum or another metal suitable for said bonding and alignment. The optoelectronic device integration tool is designed to position and immobilize the VCSEL 14, with flexible circuit 16, and electrical spacer block 13 relative to the parallel optical transceiver package 12. The frame for the spring clamping element 28 is the clamp base 22 and the spring clamp frame 25. The clamp base 22 and spring clamp frame 25 have the same uniform width. The optoelectronic device integration tool 10 straddles the parallel optical transceiver package 12 so as to position spring clamp 28 for contact with VCSEL 14.

The clamp base 22, as illustrated in FIG. 2, includes on the proximal side 23 a package engaging face 30, a spring block mating face 32, and a spring block flange 34. Opposing distal face 24 is a vertical wall with a single opening for insertion of fastener screw 40 into fastener screw hole 42. The rectangular foot 27 of clamp base 22 sits outside parallel optical transceiver package 12 during operation.

On proximal face 23, package engaging face 30 mates with the exterior face of package frame 17. Protruding from package engaging face 30 is VCSEL support 36, which is a rectangular block projection, sized for insertion into the MT connector port 15 of the parallel optical transceiver package 12. It is envisioned that VCSEL support 36 is dimensioned to replicate the connector portion of fiber optic assembly 18. The VCSEL support 36 extends proximally toward spring clamp frame 25 and stabilized clamp base 22 due to the close dimensioning of VCSEL support 36 and MT connector port 15. Additional stability is provided by package cap 38, that projects over package frame 17 perpendicular to package engaging face 30.

As illustrated in FIG. 3, spring block mating face 32 extends vertically from the distal end of package flange 38. Fastener screw hole 42 is set within face 32. Spring block mating face 32 abuts the complimentary face on spring clamp frame 25 when fastener 40 joins the blocks. Spring block flange 34 extends perpendicular to spring blockmating face 32 to form a cap over spring clamp frame 25. Flange face 44 rests on spring clamp frame 25 to prevent rotational movement and for alignment on the electronic interface substrate 26.

Figure 5:
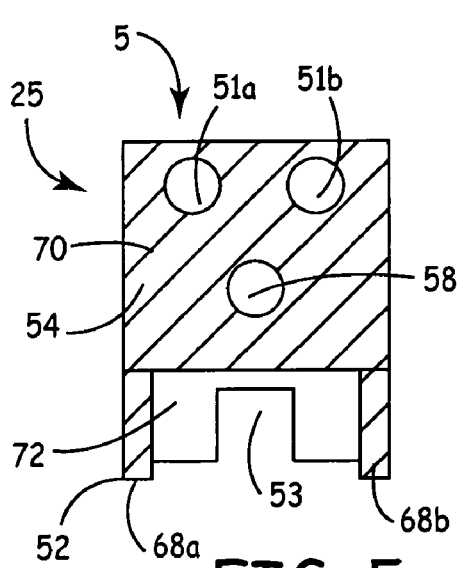
FIG. 5 is a sectional side view of the spring clamp block of the present invention.
Figure 4:
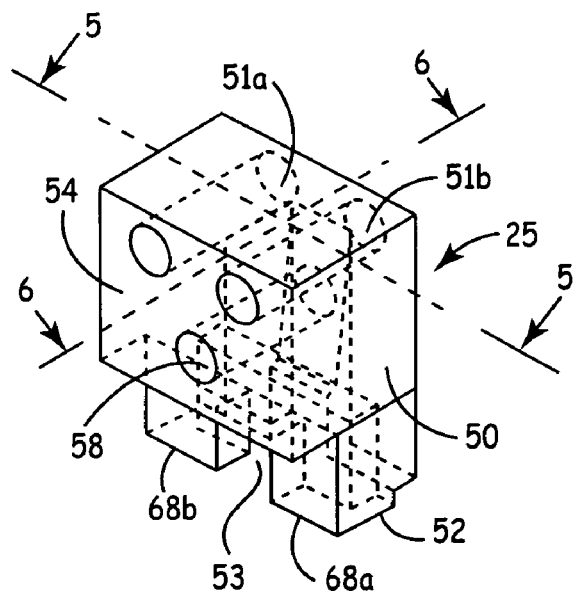
FIG. 4 is an isometric view of the spring clamp block of the present invention.
Figure 6:
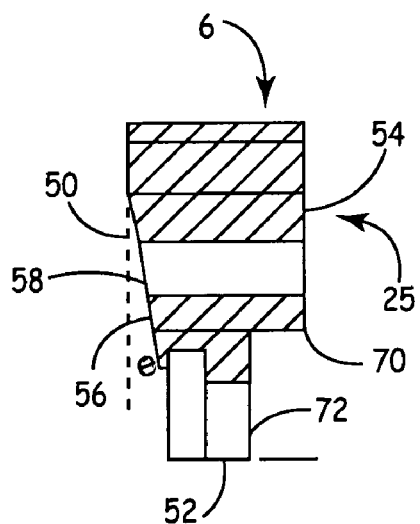
FIG. 6 is a side view of the spring clamp block of the present invention.

As illustrated in FIGS. 4–6, spring clamp frame 25 includes three operative faces; distally disposed spring clip face 50, spring block base 52, and spring block mating face 54. Spring clamp frame 25 has generally a horseshoe shape with bottom center open for access to the flexible circuit 16 and electronic substrate 26. Spring clip face 50 includes a pair of horizontal clip holes 51a, 51b at the upper end for attaching flat spring 60. Flat spring channel 56, which is inclined proximally toward spring block mating face 54, is centered between clip holes 51a and 51b and extends toward electronic substrate 26. Threaded clamp fastener hole 58 extends horizontally from spring block mating face 54 through the lower portion of flat spring channel 56.

As illustrated in FIG. 1, flat spring 60 is generally "T" shaped with fastener holes 62a and 62b aligned horizontally at the top. Threaded fasteners 64a, 64b extend through holes 62a, 62b into horizontal clip holes 51a, 51b. The lower end of flat spring 60 contains a proximally projecting curl 66 for contact with the blind face of VCSEL 14. The width of spring curl 64 is slightly less than the width of spring channel 56. The slope of channel 56, combined with the radius of projecting curl 66, provide the required force to maintain VCSEL 16 position. FIG. 6 is a sectional view of FIG. 4 taken along line 6—6. As illustrated in FIG. 6, in a first embodiment, the slope of channel 56 is 8° from vertical.

Spring block base 52 includes two "L" shaped legs 68a, 68b disposed below spring block mating face 54 and extending distally. The footprint of the present invention is intentionally minimized so as not to interfere with components of the electronic substrate 26. Moreover, spring block base 52 must provide access for attaching the flexible circuit 16.

FIG. 5 is a sectional view from FIG. 4 taken along line 5—5. As illustrated in FIG. 5, spring block mating face 54 is comprised of an upper vertical surface 70 and lower vertical surface 72. Upper vertical surface 70 includes clamp fastener hole 58 and spring holes 51a and 51b. Lower vertical surface 72 is set back from upper vertical surface 70 to allow for placement of the package frame 17 and a recess for VCSEL 14.

In operation, the optoelectronic device integration tool 10 is applied as follows. Parallel optical transceiver package 12 is disposed on a work surface (not shown). The VCSEL 14 is inserted onto lower vertical surface 72 of spring clamp frame 25. Clamp base 22 and spring clamp frame 25 are then loosely mated by inserting VCSEL support 36 through MT connector port 15 while maintaining the position of flexible circuit 16 on substrate 26. Fastener screw 40 is then inserted through screw hole 42 of clamp base 22 and threadably engages clamp fastener hole 58 of spring clamp frame 25. VCSEL 14 is now clamped between the projecting curl 66 of flat spring 60 and VCSEL support 36. Adhesive is applied to the interface between electronic substrate 26 and flexible circuit 16. In the alternative, adhesive may be applied as the first step. Note that at this point the VCSEL 14 is not attached to MT connector 18.

Figure 7:
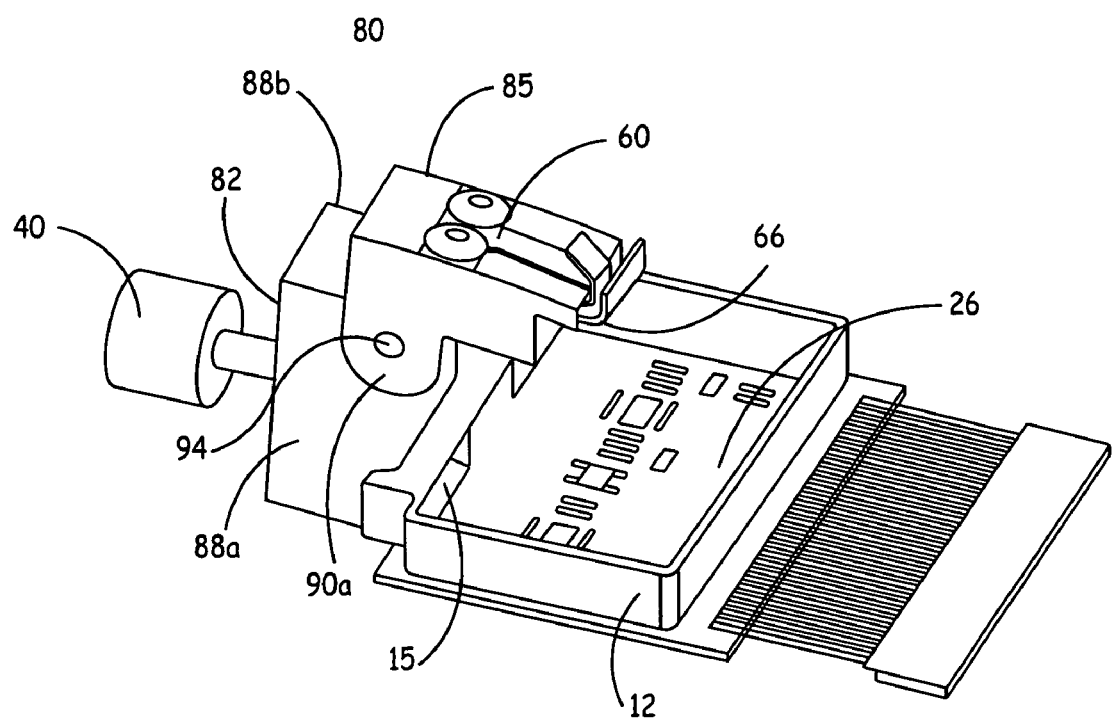
FIG. 7 is a perspective view of an embodiment of a laser package integration tool with a parallel optical package in place.
Figure 8:
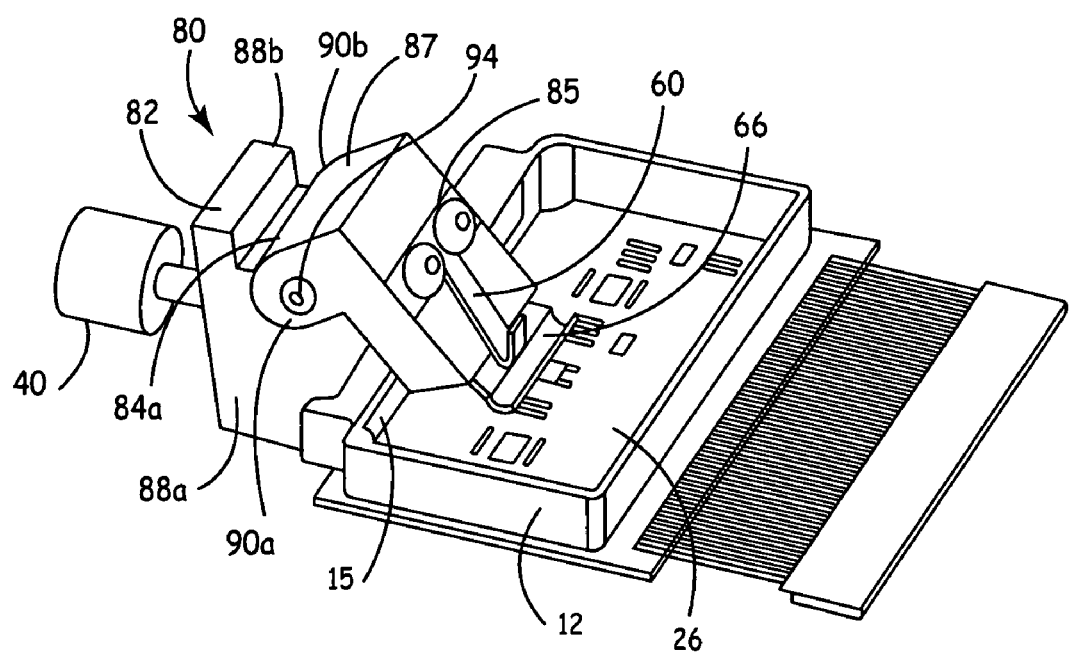
FIG. 8 is a perspective view of an embodiment of a laser package integration tool with a parallel optical package in place.
Figure 9:
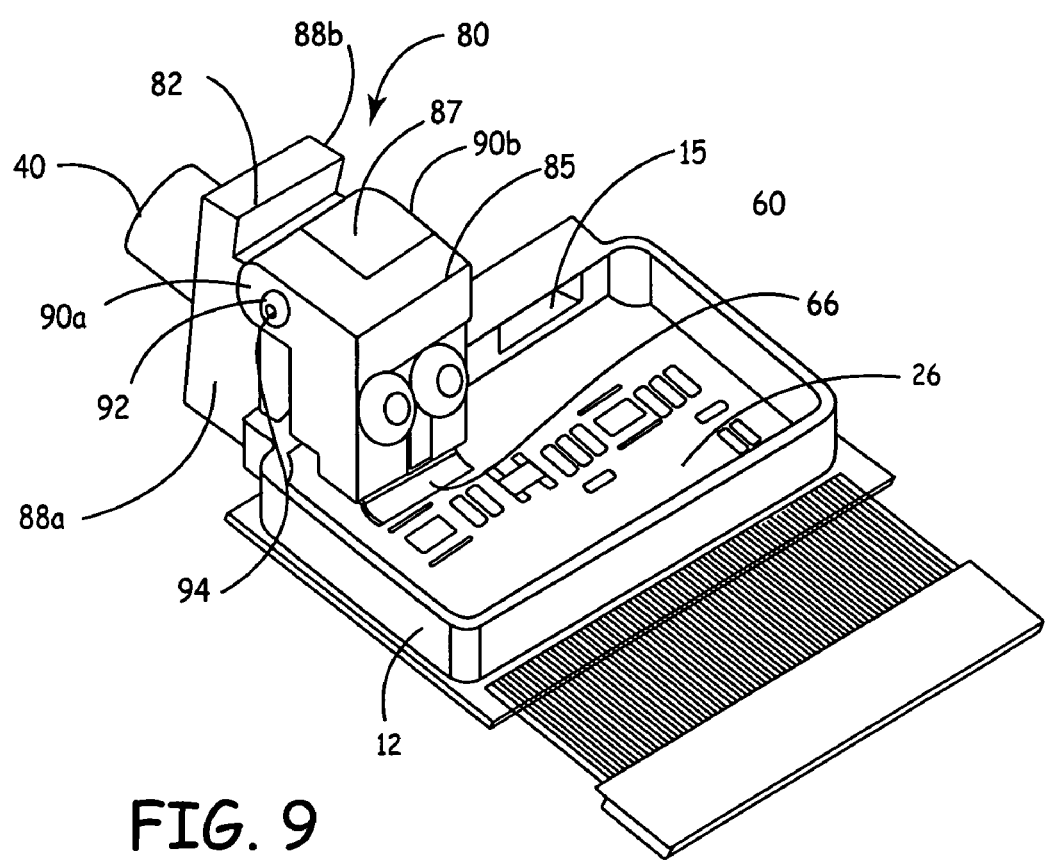
FIG. 9 is a perspective view of an embodiment of a laser package integration tool with a parallel optical package in place.
Figure 10:
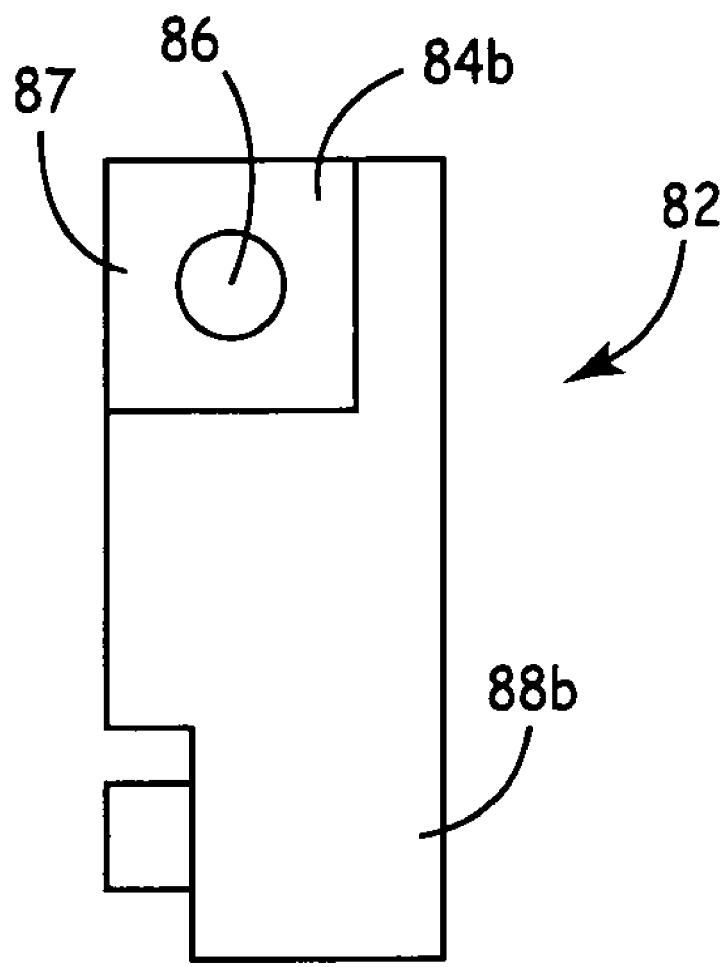
FIG. 10 is a side view of an embodiment of a clamp base of the present invention.

As illustrated in FIGS. 7, 8 and 9, an alternative embodiment of a single optoelectronic device integration tool 80 can take the form of a unitary assembly. As depicted, tool 80 comprises a clamp base 82 and a spring clamp frame 85. Clamp base 82 and spring clamp frame 85 are preferably machined from aluminum or another metal suitable for use during bonding and alignment of the fiber optic assembly 18. Clamp base 82 preferably includes many of the features previously described and illustrated in FIGS. 2 and 3 with reference to clamp base 22 with the additional inclusion of a pair of recessed surfaces 84a, 84b defining a mounting wall 87. Mounting wall 87 includes a throughbore 86 as shown in FIG. 10 connecting recessed surfaces 84a, 84b. Spring clamp frame 85 preferably includes many of the features previously described and illustrated in FIGS. 4, 5, and 6 with reference to spring clamp frame 25 with the additional inclusion of a pair of projecting arms 90a, 90b, each arm including a bore 92. Preferably, spring clamp frame 85 has a width equal to clamp base 82 while projecting arms 90a, 90b are spaced apart such that mounting wall 87 is accommodated within projecting arms 90a, 90b with the bores 92 in alignment with throughbore 86. A hinge pin 94 can then be inserted through bores 92 and throughbore 86 allowing for rotational interaction between clamp base 82 and spring clamp frame 85 around hinge pin 94. In an alternative embodiment of the single optoelectronic device integration tool 80, throughbore 86 can be replaced with a pair of partial bores, one on each side of mounting wall 87, while hinge pin 94 can be replaced with a pair of hinge pins.

In operation, the single optoelectronic device integration tool 80 performs a similar function as previously described with respect to the single optoelectronic device integration tool 10. In general, the parallel optical transceiver package 12 is disposed on a work surface (not shown). The VCSEL 14 is inserted into the lower vertical surface 72 of spring clamp frame 84. VCSEL support 36 on clamp base 82 is inserted into MT connector port 15 while maintaining the position of flexible circuit 16 on substrate 26. Spring clamp frame 85 is rotated downwardly around hinge pin 94 such that projecting curl 66 of flat spring 60 clamps VCSEL 14 against VCSEL support 36. Fastener screw 40 is then inserted through screw hole 42 of clamp base 82 and threadably engages clamp fastener hole 58 of spring clamp frame 85. Adhesive is then applied to the interface between electronic substrate 26 and flexible circuit 16. In the alternative, adhesive may be applied as the first step.

It is to be understood that the embodiments described herein are only illustrative and modifications of the various dimensions and materials can be made still within the spirit and scope of this invention.

The invention claimed is:

1. A parallel optical transceiver package assembly tool for integration of an optoelectronic device, said tool comprising:
   a clamp base connected to the parallel optical transceiver package;
   a spring clamp frame hingedly connected to the clamp base allowing for rotational engagement with the optoelectronic device; and
   a clamp connected to the spring clamp frame for engaging the optoelectronic device.

2. The parallel optical transceiver package assembly tool of claim 1 wherein the clamp base includes an optoelectronic device support inserted into an optical fiber connector port of the parallel optical transceiver package.

3. The parallel optical transceiver package assembly tool of claim 2 wherein an insertion length of the optoelectronic device support is sized to simulate a portion of an optical connector for positioning of the optoelectronic device within the parallel optical transceiver package.

4. The parallel optical transceiver package assembly tool of claim 2 wherein a cross-section of the optoelectronic device support is sized so that insertion of said support in the optical fiber connector port prevents rotational and lateral displacement of the clamp base.

5. The parallel optical transceiver package assembly tool of claim 1 wherein the clamp base further includes a base block flange cantilevered over the spring clamp frame so as to increase the stability of the assembly tool and provide positioning laterally for the optoelectronic device.

6. The parallel optical transceiver package assembly tool of claim 1 wherein the spring clamp frame is connected to the clamp base by a single fastener.

7. The parallel optical transceiver package assembly tool of claim 6 wherein the spring clamp frame includes a clamp channel for directing and maintaining clamp position.

8. The parallel optical transceiver package assembly tool of claim 6 wherein the spring clamp frame has a minimal footprint on an electronic substrate of the parallel optical transceiver package so as not to damage electrical components and allow access to the flexible circuit.

9. The parallel optical transceiver package assembly tool of claim 8 wherein the spring clamp frame has a horseshoe shape.

10. The parallel optical transceiver package assembly tool of claim 6 wherein the spring clamp frame is suspended above an electronic substrate by the fastener.

11. The parallel optical transceiver package assembly tool of claim 1 wherein the clamp is a flat spring.

12. The parallel optical transceiver package assembly tool of claim 11 wherein the flat spring includes a projecting curl for engaging the optoelectronic device.

13. The parallel optical transceiver package assembly tool of claim 1 wherein the assembly tool is constructed of a material capable of with standing elevated temperatures as required for curing.

14. A method of integrating an optoelectronic device with an electronic substrate to form a parallel optical transceiver package, said method comprising:
    installing a flexible circuit on to the optoelectronic device;
    positioning the optoelectronic device on a spring clamp frame with the flexible circuit disposed on the electronic substrate;
    fastening the spring clamp frame to a clamp base;
    clamping the optoelectronic device to the clamp base; and
    attaching the flexible circuit to the electronic substrate.

15. The method of claim 14 wherein positioning the optoelectronic device includes aligning an active face of the optoelectronic device with an optoelectronic device support projecting from the clamp base.

16. The method of claim 15 further including inserting a spacer block disposed at a distal end of the flexible circuit in a cavity in the electronic substrate.

17. The method of claim 14 wherein fastening the clamp base to the spring clamp frame includes threadably engaging at least one fastener.

18. The method of claim 17 wherein fastening includes inserting a stabilizing projection of the clamp base into an optical connector port in the parallel optical transceiver package.

19. The method of claim 14 wherein the clamping of the optoelectronic device includes a cantilevered flat spring attached at a first end to the spring clamp frame and extending toward the optoelectronic device through a clamp channel.

20. The method of claim 14 wherein attaching the flexible circuit includes applying an adhesive at an interface with the electronic substrate.

21. The method of claim 14 further includes maintaining relative position after applying adhesive for curing.

22. The method of claim 14 wherein fastening the spring clamp frame to a clamp base includes rotatably aligning the spring clamp frame and clamp base around a hinged pivot point.

23. An optoelectronic device integration tool for connecting an optoelectronic device to an electronic substrate of a parallel optical transceiver package, the tool comprising:
    means for positioning the optoelectronic device on the electronic substrate wherein means for positioning the optoelectronic device includes an optoelectronic device support inserted into an optical connector port of the parallel optical transceiver package, said optoelectronic device support providing a back stop for the optoelectronic device; and
    means for securing the optoelectronic device during the connection process.

24. The optoelectronic device integration tool of claim 23 wherein the optoelectronic device support positions the optoelectronic device perpendicular to the electronic substrate.

25. The optoelectronic device integration tool of claim 23 wherein means for positioning the optoelectronic device includes a recess within a spring clamp frame sized to limit lateral movement of the optoelectronic device relative to the optical connector port.

26. The optoelectronic device integration tool of claim 23 wherein means for securing the optoelectronic device includes flat spring suspended at a first end from the distal face of a spring clamp frame, said flat spring having a second end with a protruding curl which holds the optoelectronic device against the optoelectronic device support.

27. The optoelectronic device integration tool of claim 26 wherein the flat spring is disposed within a spring channel on a distal face of the spring clamp frame.

28. The optoelectronic device integration tool of claim 27 wherein the spring clamp frame is further restrained from twisting by a clamp base flange.

29. The optoelectronic device integration tool of claim 26 wherein the spring clamp frame is fastened to a clamp base which is in turn fixed to the parallel optical transceiver package.

30. The optoelectronic device integration tool of claim 29 wherein the spring clamp frame is rotatably aligned with the clamp base.

* * * * *